United States Patent [19]

Kunze

[11] 4,261,453
[45] Apr. 14, 1981

[54] DISENGAGING CLUTCH

[75] Inventor: Dieter Kunze, Siegburg, Fed. Rep. of Germany

[73] Assignee: Jean Walterscheid GmbH, Lohmar, Fed. Rep. of Germany

[21] Appl. No.: 48,049

[22] Filed: Jun. 13, 1979

[30] Foreign Application Priority Data

Jun. 26, 1978 [DE] Fed. Rep. of Germany ....... 2827948

[51] Int. Cl.³ ............................................. F16D 43/20
[52] U.S. Cl. ..................................... 192/56 R; 64/29; 192/71
[58] Field of Search ................... 192/56 R, 71, 76, 79; 64/29, 30 E

[56] References Cited

U.S. PATENT DOCUMENTS

| 2,514,228 | 7/1950 | Dodge | 64/29 X |
| 2,712,372 | 7/1955 | Scusa | 192/56 R |
| 2,909,047 | 10/1959 | Walterscheid-Muller et al. | 64/29 |
| 3,643,770 | 2/1972 | Faulds | 192/56 R |

FOREIGN PATENT DOCUMENTS

| 1625842 | 8/1970 | Fed. Rep. of Germany. | |
| 546356 | 2/1974 | Fed. Rep. of Germany. | |
| 785642 | 8/1935 | France | 64/29 |

*Primary Examiner*—Rodney H. Bonck
*Attorney, Agent, or Firm*—Toren, McGeady and Stanger

[57] ABSTRACT

In a disengaging clutch, catch members are spring-biased into a position for transmitting torque between a clutch hub and a clutch sleeve. Each catch member has a wedge-shaped cam cooperating with a similarly shaped cam on a control ring. The control ring is held against the catch member by a spring and it is rotatably mounted on the clutch hub. When a predetermined torque is exceeded the control ring moves axially against the action of the spring and the catch members move radially from the torque-transmitting position to a floating position. By rotating the control ring, the catch members can be displaced from the floating position into a re-engaging position before returning to the torque-transmitting position.

10 Claims, 6 Drawing Figures

DISENGAGING CLUTCH

SUMMARY OF THE INVENTION

The present invention is directed to a disengaging clutch for the protection of machine parts, such as drive shafts or the like, and includes a clutch hub, a clutch sleeve and catch members radially guided in recesses in one of the clutch hub and clutch sleeve with the catch members being spring-biased into other recesses in the other one of the clutch hub and clutch sleeve for effecting torque transmission. When a predetermined torque is exceeded the catch members are moved out of the torque-transmitting position because of their shaped configurations.

Overload clutches with radially guided catch members are known, see Swiss Pat. No. 546,356. The overload clutch disclosed in this patent operates as a so-called ratchet clutch, that is, the catch members are pressed radially outwardly by the force of a spring and engage in grooves in an outer ring. The catch members are displaced out of these grooves in the case of overloading because of the shape of the catch head. The overload clutch, however, cannot be transferred into a floating position with purely mechanical control means. Accordingly, as an additional measure, a limit switch has been used, controlled by the lift path of the catch members, which switches off an electric drive.

As a result, this clutch is not suitable for use in purely mechanical drives, that is, where the power source is other than an electromotor. When overloading occurs, the clutch operates as a so-called ratchet clutch, that is, the catch members fall back into the next groove in the direction of rotation. As is known, such ratchet clutches are subject to substantial wear and for this reason the support parts containing the grooves have been made replaceable. Moreover, during overloading, clutches of this type tend to become overheated and develop annoying noises.

In another overload clutch described in U.S. Pat. No. 3,643,770, two radially guided catch members have been provided which run against two stops, the stops are offset in the circumferential direction and are directed inwardly from a clutch sleeve. The catch members have wedge-shaped grooves in their head ends and wedge-shaped slide rods engage the grooves and are connected to a bridge. The slide rods are held in the grooves in the catch members by means of a spring acting on the bridge so that the catch members are held in the engaged position. When overloading occurs, the catch members move inwardly from the torque-transmitting position because of their shaped configuration. As a result, the wedge-shaped slide rods are pressed out of the grooves against the force of the spring. The overload clutch is thus shifted into the floating position. This particular clutch has the disadvantage that there is no defined holding position for the catch members in the floating position. Accordingly, because of centrifugal forces developed one or more of the catch members may fall back into the torque-transmitting position. If this occurs, damages may result in the overload clutch or in the drive line connected with the clutch.

Furthermore, this overload clutch has the disadvantage that it can only be connected to a drive line at its ends and it is not possible to gain access to the interior of the clutch for effecting its re-engagement.

In German Offenlegungsschrift No. 1 625 842 a torque-limiting clutch is disclosed with a radially arranged catch pin which is engaged by a spring-loaded lock member for securing it in the torque-transmitting position.

When nominal torque is exceeded, the catch member is moved radially outwardly from the secured position. Accordingly, the torque limiting clutch is shifted into the floating position.

Such a clutch has the disadvantage that for its re-engagement, the clutch must be turned until the locked position is re-established. When the clutch is part of the device in which the drive is tight, the re-engagement cannot be effected without the aid of tools, such as toggles or the like. There is no possibility for re-engagement or for transferring the clutch into a waiting position for locating the engaged position.

The primary object of the present invention is to provide a simply operating disengaging clutch which is inexpensive to produce and affords safe re-engagement from any position. Moreover, it is possible to use the disengaging clutch of the present invention for rotation in both directions without any significant expenses and, if possible, it should be possible to adjust the clutch for different torques.

In accordance with the present invention, the disengaging clutch has catch members which are spring-biased in the radial direction into the torque-transmitting position. Each catch member has a wedge-shaped cam extending from a radially extending side which interacts with a correspondingly shaped cam on a control ring. The control ring can be shifted in the axial direction of the clutch against a spring and it also can be rotated around the axis of the clutch. The cam on the control ring engages the cams on the catch member and hold them in the torque-transmitting position and the floating position. The axially directed spring biasing force directed against the control ring acts, through the cam, in the radial direction against the catch members. With the catch members in the floating position, the control ring can be turned for effecting re-engagement and the ring can be set and held in the circumferential direction by means of at least one spring or similar element for securing the torque-transmitting position.

Due to the radial arrangement of the catch members, the overload or disengaging clutch embodying the present invention can be made very small. Preferably, the catch members are arranged in the manner of a star, so that a relatively large number of the catch members can be accommodated in a very small space.

Another advantageous feature of the invention is the small number of components involved in the displacement from the torque-transmitting position into the floating position, that is, the catch members and the control ring. Accordingly, effective operation of the disengaging clutch is ensured even under difficult conditions.

The catch members can be made very light and since they are spaced only a small distance radially from the axis of rotation, the disengaging clutch operates relatively independently from the respective rate of rotation. In this arrangement, the centrifugal forces acting on the catch members can be considered as insignificant.

In the clutch embodying the present invention, the catch members are moved by springs into the engaged position and the catch members included wedge-shaped cams extending laterally from radially extending side surfaces. The control ring is held by a spring in a certain angular position within the clutch and the control ring includes an annular cam of wedge-shaped section which faces toward the cams on the catch members. In the torque-transmitting position, however, the control ring has openings between different cam portions for receiving the cams on the catch members.

This arrangement of the disengaging clutch facilitates its re-engagement from any position by simply turning the control ring against the force of the spring so that the openings between the annular cam on the control rng are turned into the position of the cams on the catch members and the catch members are displaced by their springs through the openings on the control ring. In the simplest manner, the control ring can be turned by inserting a pin or similar tool into one or several control bores located on the circumference of the control ring.

In one embodiment of the invention, at least in the floating position, the control ring does not experience the axial force of its corresponding spring.

Since the axial force of the spring does not act on the control ring in the floating position, it is possible to re-engage the clutch without applying any appreciable force. Accordingly, even in a disengaging clutch designed for high torques, it is possible to effect re-engagement with the application of small forces.

In another feature of the invention, the catch members are guided in recesses formed in the clutch hub and in the torque-transmitting position they are held in a radially outwardly directed position in recesses in the clutch sleeve.

This particular embodiment is especially suited for the transmission of higher torques, since the radial distance of the shapes surfaces on the catch members and the recesses provided in the clutch sleeve where engagement takes place for effecting torque transmission, is relatively large.

In another embodiment, the catch members are guided in recesses in the clutch sleeve and in the torque-transmitting position they extend radially inwardly into recesses in the clutch hub. In this particular embodiment, the recesses which provide torque transmission can be arranged on the outer surface of the clutch in an efficient manner. Since the effective radius which, in addition to the spring force, determines the magnitude of the torque which can be transmitted, can be kept very small, this embodiment of the disengaging clutch is particularly suited for the transmission of very small torques.

In one embodiment of the invention, the recesses into which the catch members seat in the torque-transmitting position have side surfaces which form equal angles on both sides of a radial plane passing through the intersection of the side surfaces.

A disengaging clutch with such a feature is capable of rotating in both directions and transmitting equal torques.

In a different embodiment, the side surfaces forming the recesses extend at different angles with respect to a radial plane passing through the intersection of the sides. In such an arrangement while the disengaging clutch is capable of transmitting torques in both directions of rotation, the torque which can be transmitted is determined in accordance with the angular arrangement of the side surfaces.

Another feature of the invention involves the limitation of the angular displacement of the control ring relative to the catch member. The rotation of the control ring is limited by stops between the torque transmitting position and the re-engaging position. Because of the stops, the control ring can only be turned over an angular range between the torque-transmitting position and the re-engaging position. Accordingly, the torque-transmitting position and the re-engaging position are predetermined for the disengaging clutch.

Another feature of the disengaging clutch is the ability to lock the control ring relative to the catch members in the re-engaging position.

As a result, in its normal position, the disengaging clutch can operate as a shifting clutch, however, it acts as a ratchet in the position where it is locked in the re-engaging position and the torque-transmission is determined by the force of the springs acting against the catch members.

Accordingly, a disengaging clutch constructed in this manner is capable of transmitting torques of diverse magnitudes, in one instance it can operate as a disengaging clutch and in another as an overload ratchet.

The clutch embodying the present invention can be used advantageously in agitators in the chemical industry where liquids of considerably different consistencies are worked.

In another embodiment of the invention, a lifting magnet is located at the outer circumferential periphery of the clutch sleeve and acts against the control ring for moving it into the re-engaging position.

Because of this feature, the clutch can be re-engaged by remote control. Such a feature is desirable when the clutch is utilized in inaccessible locations within a drive line or, for wxample, in parts of a nuclear power plant which are subject to radiation. Due to its simple and compact design and the many possible variations which can be achieved without any significant technical effort in the disengaging clutch embodying the present invention, the clutch has a wide field of application, such as in machine tools, drives for agricultural machines and in other technical fields in which drive lines must be protected against overloading.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figures 1, 2:
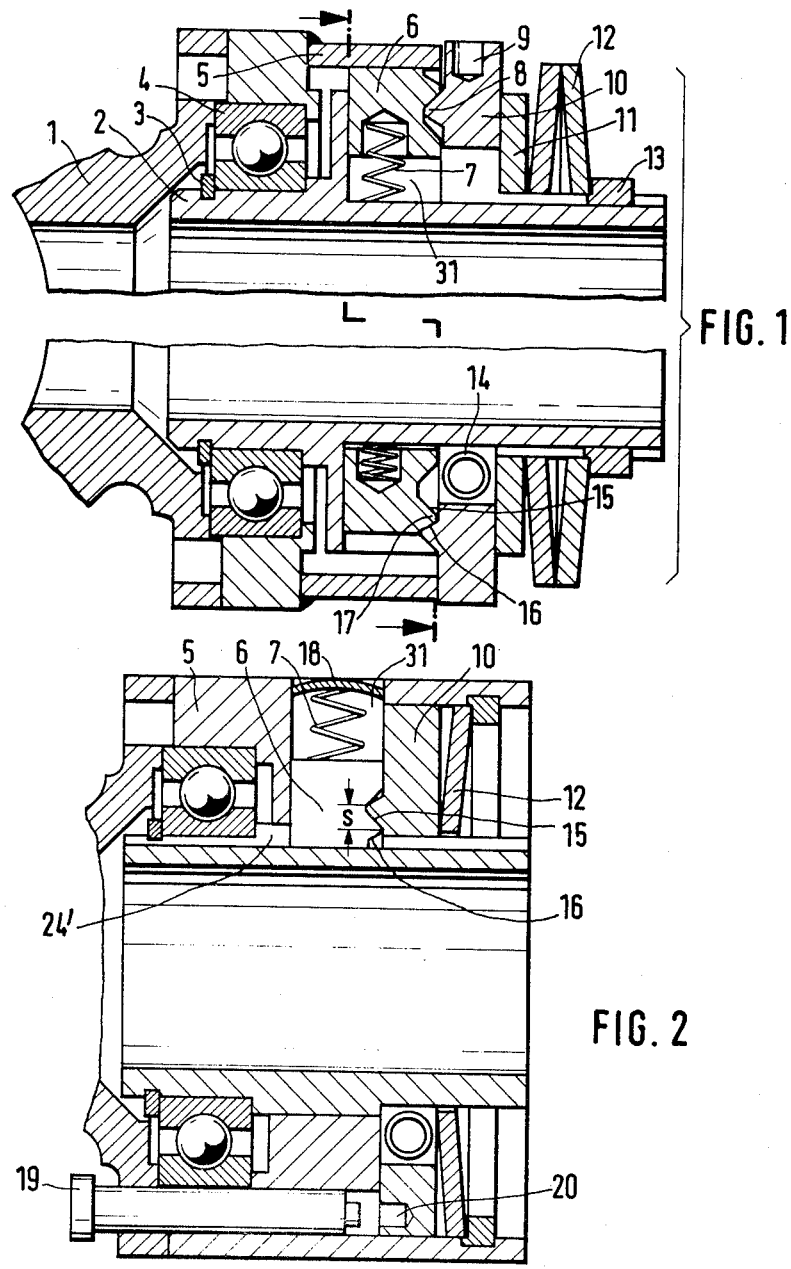
FIG. 1 is a longitudinal sectional view through a disengaging clutch with the catch members positioned within the clutch hub, the upper half of the section illustrates the clutch in the torque-transmitting position while the lower half shows it in the floating position.
FIG. 2 is a longitudinal sectional view of another embodiment of the disengaging clutch with the catch members positioned in the clutch sleeve and engaging, in the torque-transmitting position, within recesses in the clutch hub.

In FIG. 1 the disengaging clutch consists essentially of a clutch hub 2 and a clutch sleeve 5. A yoke 1 shown only in part, is connected directly to the clutch sleeve 5 so that it does not rotate relative to the clutch sleeve. A roller bearing 4 is secured against axial displacement on the clutch hub 2 by a spring ring 3. The clutch sleeve is supported by the roller bearing 4 on the clutch hub 2.

Catch members 6 are radially movably supported in recesses 31 in the clutch hub 2 and the recesses are open in the radially outward direction and also on one side in the axial direction of the clutch. A control spring 71 biases each catch member 6 in the radially outward direction. In the torque-transmitting position of the clutch, catch members 6 engage in recesses 24 or 25 of the clutch sleeve, note recesses 24 in FIG. 4 and recesses 25 in FIG. 3. Each catch member has a wedge-shaped cam on its radially extending side surface, that is, the side surface extending transversely of the axial direction of the clutch hub. The wedge-shaped cams 17 interengaged with the annular cam 8 located on the surface of the control ring 10 facing the catch members. By cooperation of the cams 17 and the annular cam 8 the catch members are held radially outwardly in the recesses 24 or 25 of the clutch sleeve 5.

Due to the torque which acts on the disengaging clutch, because of the inclined surfaces forming the side surfaces of the recesses 24 or 25, a radially inwardly directed force component acts on the wedge-shaped heads of the catch members 6. Additionally, because of the wedge-shaped design of the cams 17 on the catch members 6 the torque maintaining cam surface 15 interacts with a corresponding surface on the annular cam so that the control ring 10 tends to yield in the axial direction away from the catch members 6,that is, toward the right as viewed in FIG. 1. This tendency of the control ring 10 to yield away from the catch member is counteracted by the force of the spring 12 until the predetermined disengaging torque is reached. The spring 12 which encircles the clutch hub acts on the control ring through the support ring 11.

The initial tension of the spring 12 and, thus, the nominal torque of the disengaging clutch, can be adjusted, as required, by the adjusting nut 13 located on the opposite side of the springs 12 from the support ring 11.

When the predetermined nominal torque is exceeded, the force of the annular cam 8 acting against the cams 17 on the catch members 6 is overcome. Accordingly, the control ring is displaced axially against the force of the spring 12 and the catch members 6 are displaced radially inwardly out of the recesses 24 or 25 in the hub sleeve 5.

The radial depth of the recesses 24, 25 is greater than the radial dimension of the wedge surfaces of the cams 17 and 8 which interact in the torque-transmitting position. As a result, it is ensured that the catch members are impelled by the annular cam into the floating position and are held in this position after the cam 17 passes the annular cam.

As shown in the upper half of FIG. 1, a control ring 10 is supported by support ring 11 as a result of the axial component acting on the control ring 10 during torque-transmission. In the floating position, however, as shown in the lower half of FIG. 1, only the force component generated by the control spring 7 acts in the axial direction on the control ring 10. In this arrangement the springs 12 are supported on both sides at stationary points, that is, by the support ring 11 and the adjusting nut 13. Accordingly, the springs do not act on the control ring 10 or the catch members 6. Because of this feature, the control ring 10can be easily turned from the floating position for effecting re-engagement of the disengaging clutch.

As can be seen in the lower half of FIG. 1, the annular cam 6 bears against the surface 16 of the cam 17 on the catch members 6 in the floating position. During re-engagement, as the control ring is rotated, the annular cam 8 slides over the cam surface 16 on the cam 17 until the cam 17 align with the openings 27 formed through the annular cam 8, note FIG. 5, so that the catch members are biased through the openings 27 by the springs 7. If, by chance, the disengaging clutch assumes a position such that the catch members 6 cannot fall into the recesses 24 and 25 of the clutch sleeve 5, the catch members remain in the openings 27 in a waiting position. In such a case, the control ring has its annular cam resting against the cams 17 on the catch members 16 and the clutch is held in the open position. When the drive of the clutch hub 2 is switched on again, the clutch hub rotates relative to the clutch sleeve and, when the catch members 6 become aligned with the recesses 24 and 25 in the clutch sleeve 5, the catch members move into the recesses under the biasing action of the springs 7. The retention of the control ring in the open position is overcome and the control ring rotates under the influence of the spring 14, note FIG. 3, so that the annular cam 8 on the control ring engages behind the cams 17 on the catch members and, once again, the control ring retains the catch members in the torque-transmitting position.

To rotate the control ring 10 for re-engaging the clutch, in the simplest manner a pin, not shown, is inserted into a control bore 9 located in the outer circumferential surface of the control ring 10, note the upper portion of FIG. 1.

The longitudinal section shown in FIG. 1 is similar to the section shown in FIG. 2.

In FIG. 2 the arrangement of the disengaging clutch is reversed as compared to FIG. 1 with the catch members 6 arranged within recesses 31 in the clutch sleeve 5 and engaging, in the torque-transmitting position, in recesses 24' in the clutch hub 2. For the purpose of simplified production, the recesses 31 for the catch members extend completely through the sleeve and are closed at the radially outer surface of the sleeve by covers 18 with the springs 7 extending between the covers and the catch members 6. In this embodiment, the spring 12 acting on the control ring 10 is not held between stationary point in the floating position, rather the spring is in direct contact with the control ring 10 and no force is provided when no torque is applied to the disengaging clutch. In the lower part of FIG. 2, a locking pin 9 is axially movably arranged within the clutch sleeve 5. The locking pin 19 can be moved into a locking bore 20 located in the control ring 10. By this locking arrangement, the control ring can be secured in the re-engaging position relative to the catch members 6, that is, the cams 17 on the catch members 6 do not contact the annular cam 8 on the control ring 10 in the torque-transmitting position.

In this arrangement, the disengaging clutch acts as a ratchet with the catch members 6 held in the torque-transmitting position merely by the force of the springs 7. In this embodiment as an overload ratchet, the disengaging clutch can only transmit a much lower torque than in the embodiment where the cams 17 of the catch members bear against the annular cam 8.

Figure 3:
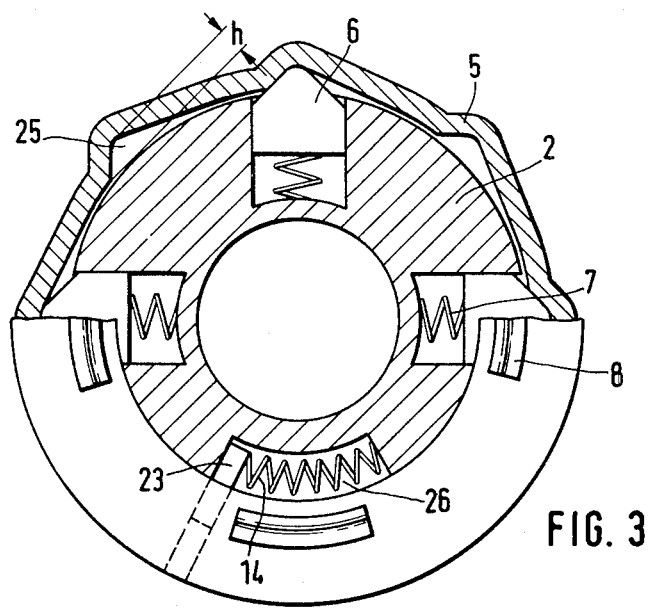
FIG. 3 is a cross-sectional view, taken along the section line shown in FIG. 1, where the side surfaces of the recesses in the clutch sleeve are disposed at different angles to a radial plane passing through the intersection of the side surfaces in the base of the groove.

FIG. 3 illustrates a section through the disengaging clutch taken along the sectional line illustrated in FIG. 1. In this embodiment, the recesses 25 in the clutch sleeve 5 in which the catch members 6 engage, have obliquely extending side surfaces intersecting at the base of the recesses. The side surfaces are each disposed at a different angle to a radial plane passing through the intersection of the side surfaces at the base of the recesses. In this arrangement, the disengaging clutch can be rotated in both directions, however, due to the different limiting angles of the side surfaces of the recesses 25, different torques are transmitted in each rotational direction.

The spring 14 which moves the control ring back from the re-engaging position into the torque-transmitting position, is located within recess 26 in the clutch hub 2. The spring 14 bears against the clutch hub at one end and against a spring bracket 23 attached to the control ring 10 at the other end. In this arrangement, the rotation of the control ring 10 is limited based, on one hand, on the block length of the spring 14, and, on the other hand, by the contact with the bracket 23.

To ensure the ability to shift the disengaging clutch from the torque-transmitting position to the floating position without any problems, the maximum depths of the recesses 24, 24', 25, as indicated by the dimension "h" in FIG. 3, must always be greater than the radial dimension of the torque-transmitting cam surface 15 designated by the dimension "s" in FIG. 2. When the nominal torque is exceeded, the catch members are fully displaced out of the recesses 24 or 25 and the cam surface 16 contacts a corresponding surface on the annular cam 8 for maintaining the catch members 6 in the floating position. With the annular cam 8 bearing against the cam surface 16 a force component is applied to the catch members 6 which has the effect of displacing them further out of the torque-transmitting position.

Figure 4:
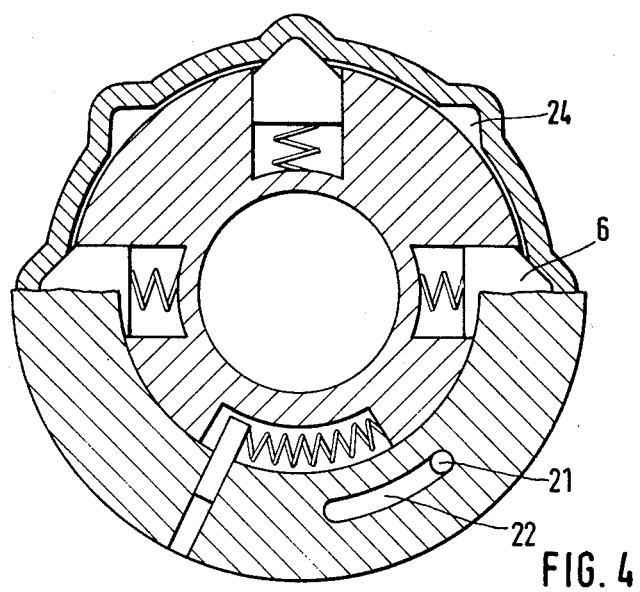
FIG. 4 is a cross-sectional view through another disengaging clutch, however, the side surfaces of the recesses form equal angles with a radial plane passing through the intersection of the side surfaces.

In FIG. 4 a disengaging clutch is illustrated in which the recesses 24 of the clutch 5 interact with the catch members 6 in the torque-transmitting position. As distinguished from the recesses 25 in FIG. 3, the side surfaces of the recesses 24 are disposed at equal angles to a radial plane passing through the intersection of the side surfaces at the base of the recesses 24.

Because of the angular configuration of the recesses 24, the disengaging clutch illustrated in FIG. 4 is suited for the transmission of equal torques in both rotational directions. Further, an additional stop 21 is shown in FIG. 4 which extends into an arcuate slot 22 and limits the end position of the control ring 10 when the clutch is in the torque-transmitting position and the re-engaging position.

Figure 5:
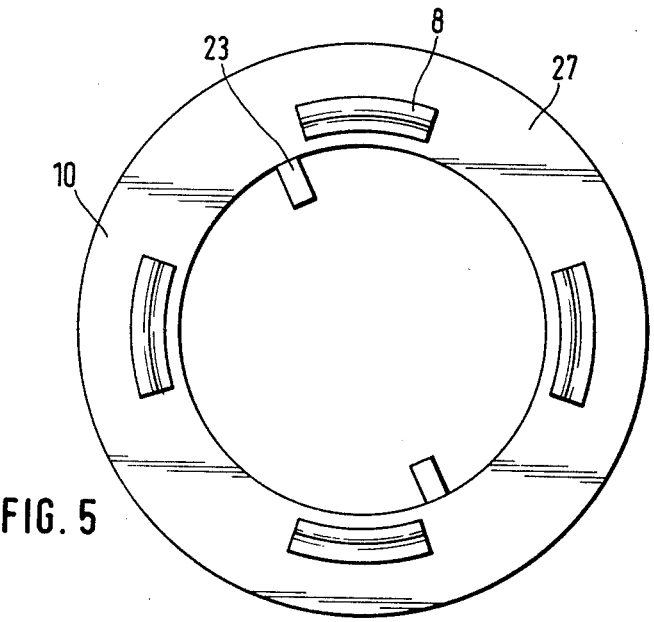
FIG. 5 is a front view of that surface of the control ring facing toward the catch members.

In FIG. 5 a preferred embodiment of the control ring 10 is illustrated with the annular cam 8 angularly interrupted by openings 27 so that the catch members 6 along with their cams 17 can move outwardly from the floating position through the openings 27 into a re-engaging position preparatory to moving into the torque transmitting position.

Figure 6:
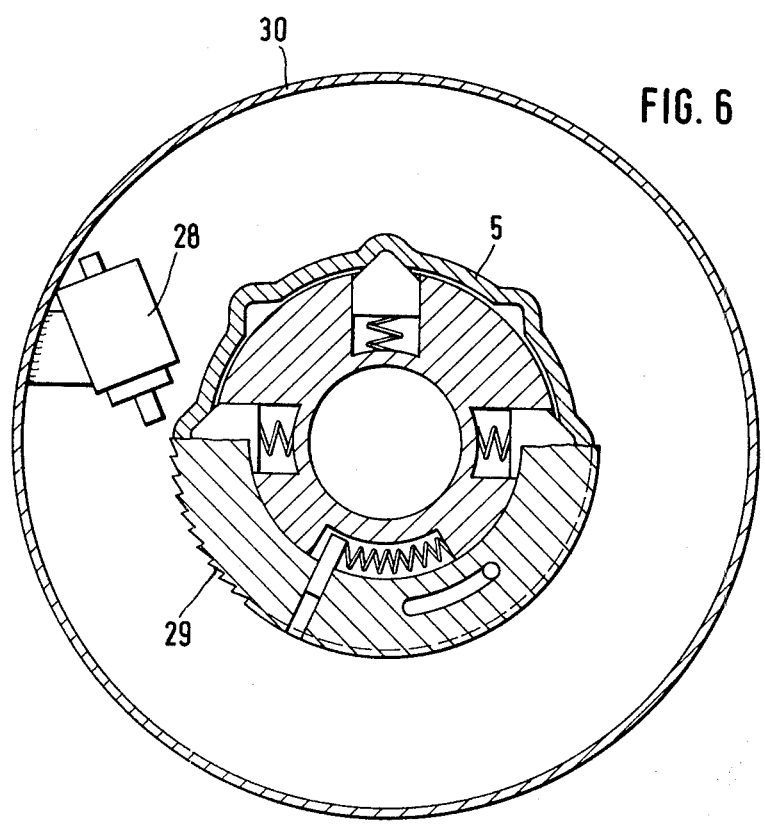
FIG. 6 is a transverse sectional view of another embodiment of the disengaging clutch in which a lifting magnet is provided for re-engaging the clutch by remote control.

In FIG. 6, another embodiment of the disengaging clutch is illustrated including a lifting magnet 28 located outwardly from the outside circumferential surface of the clutch sleeve 5. The outer circumferential periphery of the control ring 10 has a plurality of saw teeth 29 extending around an arcuate portion. When the magnet 28 is actuated it interacts with the saw teeth 29 and turns the control ring 10 into the engaging position. To avoid any accidental contact, the entire disengaging clutch is enclosed in a hood 30 which surrounds the clutch sleeve 5 and the lifting magnet 28.

While specific embodiments of the invention have been shown and described in detail to illustrate the application of the inventive principles, it will be understood that the invention may be embodied otherwise without departing from such principles.

What is claimed is:

1. Disengaging clutch for protecting machine parts, such as drive shafts and the like, comprising a clutch hub having a central axis, a clutch sleeve laterally enclosing said hub and extending in parallel relation with the central axis of said hub, catch members for releasably interengaging said clutch hub and clutch sleeve, one of said clutch hub and clutch sleeve having first recesses therein for receiving and guiding said catch members in the radial direction relative to the central axis of said hub, the other one of said clutch hub and clutch sleeve having second recesses therein for receiving said catch members and interengaging said clutch hub and clutch sleeve, first spring means for biasing said catch members into engagement within said second recesses, said catch members being radially displaceable out of said second recesses when a predetermined torque is exceeded, wherein the improvement comprises that each said catch member has an end surface positionable within one of said second recesses and a radially extending side surface located in a plane extending transversely of the central axis of said hub, a first wedge-shaped cam on and extending outwardly from said side surface of said catch member, said first wedge-shaped cam extending in the axial direction of the central axis, a control ring encircling the central axis of said clutch hub and having a first surface and a second surface each extending transversely of the central axis with said first surface facing toward said catch members and said second surface facing in the opposite direction, second spring means associated with said control ring and arranged to hold said control ring against said catch members, said control ring being rotatably displaceable around the central axis of said clutch hub, said control ring having a second wedge-shaped cam formed on said first surface, said second cam arranged to contact said first cams for holding said catch members in one of a torque-transmitting position and a floating position, said second spring means providing an axially directed force against said control ring and via said second cam thereon effecting a radially acting force on said first cams in the torque-transmitting and floating positions, said control ring being rotatably displaceable from the position for holding said catch members in the torque-transmitting and floating positions to another position for displacing said catch members from the floating position and re-engaging the catch members in the torque-transmitting position, and third spring means for biasing said control ring from the re-engaging position back into the torque-transmitting position.

2. Disengaging clutch, as set forth in claim 1, wherein said first wedge-shaped cam extends from said catch-member in the axial direction of said clutch hub, said second cam extends annularly on said first surface of control ring and said second cam is divided into a plurality of angularly spaced apart second cam sections with openings provided therebetween so that said first cams on said catch members can be biased by said first spring means from the floating position to the re-engaging position.

3. Disengaging clutch, as set forth in claim 1, including means for supporting said second spring means for preventing said second spring means from transmitting axial force to said control ring when said catch members are located in the floating position.

4. Disengaging clutch, as set forth in claim 1, wherein said catch members are guided in said first recesses located in said clutch hub, and in the torque-transmitting position said catch members are biased by said first spring means into said second recesses located in said clutch sleeve.

5. Disengaging clutch, as set forth in claim 1, wherein said catch members are guided in said first recesses located in said clutch sleeve, and in the torque transmitting position said catch members are biased by said first spring means into said second recesses located in said clutch hub.

6. Disengaging clutch, as set forth in claim 1, wherein said second recesses have a pair of side surfaces each spaced at an equal angle from a radially extending plane passing through the intersection of said side surfaces at the base of said second recesses.

7. Disengaging clutch, as set forth in claim 1, wherein said second recesses have a pair of side surfaces each spaced at a different angle from a radially extending plane passing through the intersection of said side surfaces at the base of said second recesses.

8. Disengaging clutch, as set forth in claim 1, wherein stop means are arranged in the path of rotational movement of said control ring for limiting the rotational movement of said control ring.

9. Disengaging clutch, as set forth in claim 1, including means for locking said control ring in the re-engaging position spaced angularly from the position thereof in the torque-transmitting and floating positions of said catch members.

10. Disengaging clutch, as set forth in claim 1, including a lifting magnet located exteriorly of said clutch sleeve, ratchet teeth formed on the radially outer periphery of said control ring, said lifting magnet displaceable into contact with said ratchet teeth for rotationally displacing said control ring into the re-engaging position.

* * * * *